(12) United States Patent
Beaver et al.

(10) Patent No.: US 10,570,619 B2
(45) Date of Patent: Feb. 25, 2020

(54) CONCRETE ANCHOR AND COVER FOR SAME

(71) Applicant: PRECISION-HAYES INTERNATIONAL INC., Seagoville, TX (US)

(72) Inventors: Tim Beaver, Sugar Land, TX (US); Thomas Mathews, Midlothian, TX (US); Paul Hohensee, West Bend, WI (US)

(73) Assignee: PRECISION-HAYES INTERNATIONAL INC., Seagoville, TX (US)

( * ) Notice: Subject to any disclaimer, the term of this patent is extended or adjusted under 35 U.S.C. 154(b) by 0 days.

(21) Appl. No.: 16/266,909

(22) Filed: Feb. 4, 2019

(65) Prior Publication Data

US 2019/0242132 A1 Aug. 8, 2019

Related U.S. Application Data

(60) Provisional application No. 62/626,372, filed on Feb. 5, 2018.

(51) Int. Cl.
*E04C 5/16* (2006.01)
*E04C 5/12* (2006.01)
*B23K 20/10* (2006.01)
*E04C 5/10* (2006.01)

(52) U.S. Cl.
CPC .............. *E04C 5/161* (2013.01); *B23K 20/10* (2013.01); *E04C 5/12* (2013.01); *E04C 5/122* (2013.01); *E04C 5/10* (2013.01)

(58) Field of Classification Search
CPC ... E04C 5/161; E04C 5/12; E04C 5/10; E04C 5/122
See application file for complete search history.

(56) References Cited

U.S. PATENT DOCUMENTS

| | | | |
|---|---|---|---|
| 4,896,470 A | 1/1990 | Sorkin |
| 5,720,139 A | 2/1998 | Sorkin |
| 5,749,185 A | 5/1998 | Sorkin |
| 5,839,235 A | 11/1998 | Sorkin |
| 6,023,894 A | 2/2000 | Sorkin |
| 6,098,356 A | 8/2000 | Sorkin |
| 6,381,912 B1 | 5/2002 | Sorkin |
| 6,560,939 B2 | 5/2003 | Sorkin |
| 6,631,596 B1 | 10/2003 | Sorkin |
| 6,817,148 B1 | 11/2004 | Sorkin |

(Continued)

FOREIGN PATENT DOCUMENTS

| | | |
|---|---|---|
| EP | 1302271 A1 | 4/2003 |
| WO | 9111569 A1 | 8/1991 |
| WO | 2017023940 A1 | 2/2017 |

OTHER PUBLICATIONS

European Search Reporting issued in EP App. No. 19155500.2, dated Jul. 8, 2019 (5 pages).

*Primary Examiner* — Rodney Mintz
(74) *Attorney, Agent, or Firm* — Adolph Locklar

(57) ABSTRACT

A method for forming a concrete anchor may comprise the steps of providing an anchor body, at least partially encapsulating the anchor body in a sealing cover, providing at least one tubular member, engaging an end surface of the tubular member against a surface of the sealing cover so as to weld the member to the sealing cover.

18 Claims, 11 Drawing Sheets

(56) References Cited

U.S. PATENT DOCUMENTS

| | | | |
|---|---|---|---|
| 7,424,792 B1 | 9/2008 | Sorkin | |
| 7,676,997 B1 | 3/2010 | Sorkin | |
| 7,793,473 B2 | 9/2010 | Sorkin | |
| 7,797,894 B1 | 9/2010 | Sorkin | |
| 7,797,895 B1 | 9/2010 | Sorkin | |
| 7,823,345 B1 | 11/2010 | Sorkin | |
| 7,841,061 B1 | 11/2010 | Sorkin | |
| 7,841,140 B1 | 11/2010 | Sorkin | |
| 7,856,774 B1 | 12/2010 | Sorkin | |
| 7,866,009 B1 | 1/2011 | Sorkin | |
| 7,950,196 B1 | 5/2011 | Sorkin | |
| 7,950,197 B1 | 5/2011 | Sorkin | |
| 7,963,078 B1 | 6/2011 | Sorkin | |
| 8,065,845 B1 | 11/2011 | Sorkin | |
| 8,087,204 B1 | 1/2012 | Sorkin | |
| 9,097,014 B1 | 8/2015 | Sorkin | |
| 9,926,698 B2 | 3/2018 | Sorkin | |
| 9,982,434 B1 * | 5/2018 | Crigler | E04C 5/122 |
| 10,145,114 B2 * | 12/2018 | Sorkin | E04C 5/122 |
| 10,378,210 B2 * | 8/2019 | Hayes | E04G 21/12 |
| 10,508,447 B2 * | 12/2019 | Mathews | E04C 5/122 |
| 2015/0330078 A1 * | 11/2015 | Sorkin | E04B 1/66 |
| | | | 52/223.13 |
| 2017/0037626 A1 * | 2/2017 | Sorkin | E04C 5/122 |
| 2017/0328065 A1 * | 11/2017 | Sorkin | E04C 5/12 |
| 2018/0023298 A1 * | 1/2018 | Hayes | E04G 21/12 |
| | | | 52/223.13 |
| 2018/0313086 A1 * | 11/2018 | Mathews | E04C 5/122 |
| 2019/0063066 A1 * | 2/2019 | Sorkin | E04C 5/122 |
| 2019/0242131 A1 * | 8/2019 | Scott | E04C 5/122 |

* cited by examiner

CONCRETE ANCHOR AND COVER FOR SAME

CROSS-REFERENCE TO RELATED APPLICATIONS

This application is a non-provisional which claims priority from U.S. provisional application No. 62/626,372, filed Feb. 5, 2018, which is incorporated by reference herein in its entirety.

FIELD

The present application relates to anchors for reinforced concrete, and particularly to a cover for a concrete reinforcement anchor.

BACKGROUND

Concrete is capable of withstanding significant compressive loads, but is more susceptible to failure when subjected to significant tensile loads. Thus, concrete structures are often reinforced with steel bars, cables, or similar to enhance the structure's ability to withstand tensile forces.

SUMMARY

In one aspect, a concrete anchor may include a body and a cover. The body may include a bore extending along an axis of the body and a bearing surface oriented in a plane substantially perpendicular to the axis. The cover may include a first portion and a second portion. The first portion may at least partially encapsulate the body and the second portion may be joined to the first portion by a welding process. The second portion may be an elongated tube for covering a portion of a tendon extending through the bore.

In some aspects, the first portion may include a first end surface, the second portion may include a second end surface, and the second end surface may be joined to the first end surface. One of the first and second portions may include an end surface and a plurality of protrusions extending from the end surface, and the other of the first and second portions may include at least one mating protrusion for engaging the plurality of protrusions. The plurality of protrusions may include a first protrusion, a second protrusion positioned radially outwardly from the first protrusion, and a third protrusion positioned radially outwardly from the second protrusion. The at least one mating protrusion may include a first mating protrusion positioned between the first and second protrusions, and a second mating protrusion may be positioned between the second and third protrusions. Each of the protrusions and the mating protrusions may have an annular shape.

In some aspects, the second protrusion may have at least one of a larger axial height and a larger radial thickness relative to the first and third protrusions. In some aspects, a space between the first and second protrusions and/or a space between the second and third protrusions may each define a pocket to control or receive material flow during spin welding.

In some aspects, the second portion may be joined to the first portion by spin welding or by ultrasonic welding.

In another aspect, a cover for a body of a concrete anchor may include a first portion and a second portion. The first portion may be configured to at least partially encapsulate the body and the second portion may be joined to the first portion by welding.

In yet another aspect, a method for forming a cover for a concrete anchor may include: at least partially encapsulating an anchor body in a sealing cover; securing one of the encapsulated anchor body and a member against movement; rotating the other of the encapsulated anchor and the member; and engaging an end surface of the member against a surface of the sealing cover to weld the member to the sealing cover. Engaging the end surface of the member may include moving protrusions on the end surface to engage mating protrusions on the surface of the sealing cover. In some aspects, the step of moving the protrusions may form radial pockets to receive and/or control the flow of the welded material.

In yet another aspect, a method for forming a cover for a concrete anchor includes: at least partially encapsulating an anchor body in a sealing cover; positioning a member adjacent a surface of the sealing cover; and vibrating the member at a high frequency against the surface of the sealing cover to melt a portion of the member and a portion of the sealing cover to join the member and the sealing cover. The step of vibrating the member may include positioning a sonotrode against a portion of the member to transmit vibrational energy to the member. Vibrating the member may cause the melted portions of the member and the sealing cover to flow into pockets formed between the end of the member and the surface of the sealing cover.

DETAILED DESCRIPTION

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings. Likewise, unless explicitly so recited, a sequential recitation of steps does not require sequential performance of those steps.

Figure 4:
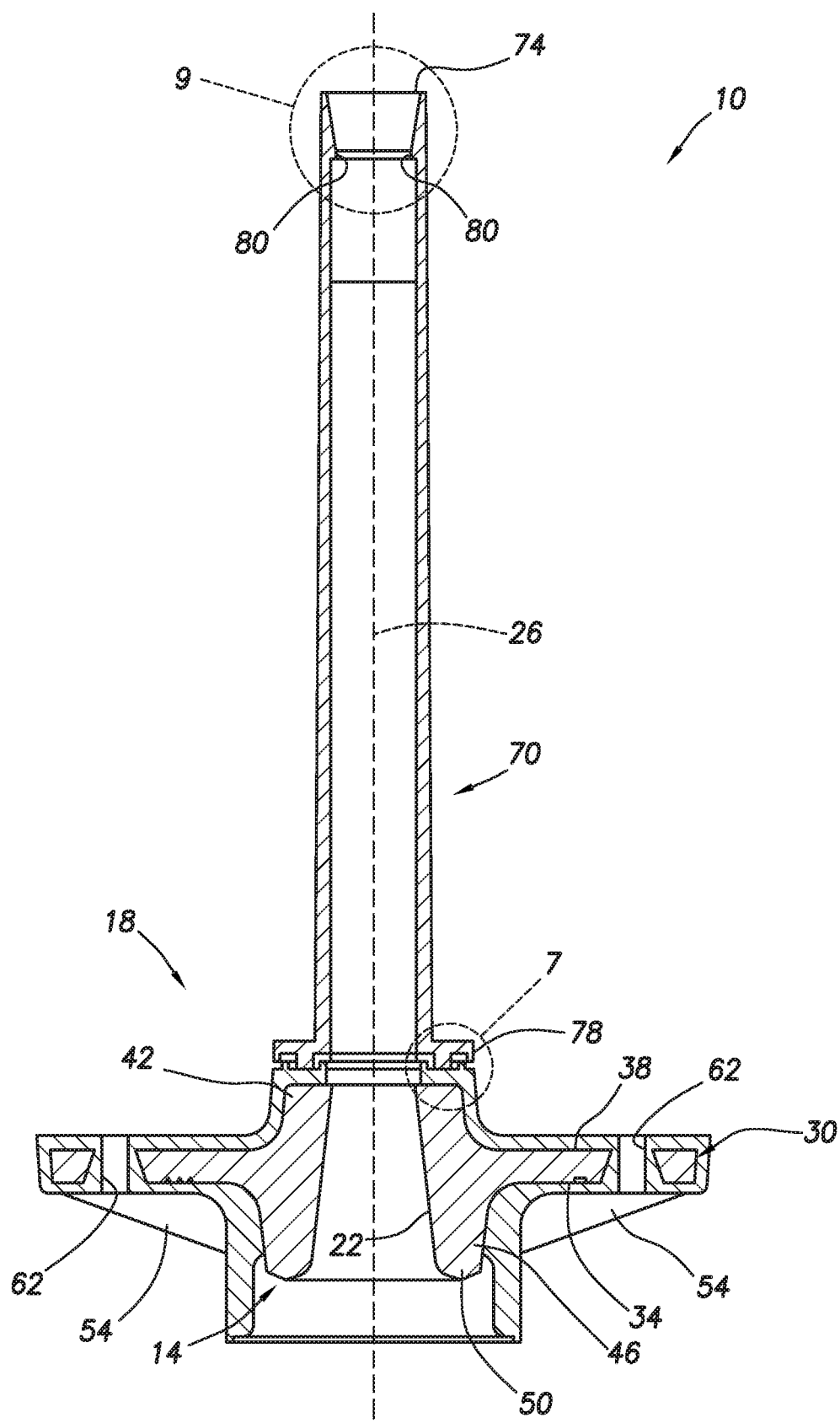
FIG. 4 is a cross-sectional view of the anchor and the tubular member of FIG. 3, viewed along section 4-4.

FIGS. 1-4 illustrate an anchor 10 for securing a tensioned cable or tendon (not shown) for reinforcing a concrete slab. In the illustrated embodiment, the anchor 10 includes an anchor body 14 (FIG. 4) covered by an encapsulation or cover 18 for sealing the anchor body 14. The anchor body 14 can be formed from a metallic material, such as cast steel or ductile iron, and may be formed as a unitary component via a single casting, forging, or other suitable process. As shown in FIG. 4, the anchor body 14 includes a bore 22 extending along an axis 26. The tendon (not shown) passes through the bore 22; in the illustrated embodiment, the bore 22 is tapered along the axis 26 to receive one or more wedges (not shown) to secure the tendon relative to the anchor body 14. That is, a diameter of the bore 22 proximate one side of the body 14 is larger than a diameter proximate the other side of the body 14. The wedges abut against the inner bore surface 22 and engage an outer surface of the tendon.

Referring now to FIG. 4, the anchor body 14 includes a flange 30 having a first or forward side 34 and a second or rear side 38. The rear side 38 provides a bearing surface abutting a portion of the concrete slab (not shown) while tension is applied to the tendon. In the illustrated embodiment, the anchor body 14 also includes a projection 42 extending from the rear side 38 and a nose portion 46 extending from the forward side 34 of the flange 30. The nose portion 46 may include a seating surface 50 (e.g., for engaging a hydraulic jack tensioner (not shown) during the tensioning of the tendon). Also, in the illustrated embodiment, ribs 54 extend between the nose portion 46 and the forward side 34 of the flange 30, and the ribs 54 may increase the rigidity and/or strength of the anchor 10. The flange 30 may have a rectangular shape, and the projection 42 and the nose portion 46 are each centered on their respective surfaces of the flange 30. The flange 30 extends laterally (e.g., in a direction perpendicular to the axis 26 of the bore 22).

In the illustrated embodiment, the anchor 10 also contains holes 62 extending through the flange 30. Two holes 62 are shown in FIGS. 1-4, but other embodiments may include fewer or more holes 62. The holes 62 may receive a fastener for securing the anchor 10 to the concrete slab or into a form board (not shown). In other embodiments, the anchor 10 may be free of any mounting holes 62 altogether and may be attached to the concrete slab or form board by other means.

The cover 18 may be secured to the anchor body 14 by an insert-molding process. The cover 18 seals at least a portion of the anchor body 14 from the concrete and liquids/additives entrained within the concrete, thereby inhibiting corrosion of the anchor body 14. The cover 18 can be formed as a unitary component via a single casting, molding, or other suitable process. The cover 18 is preferably formed of plastic (e.g., nylon, polyethylene, ABS, PVC, etc.). In the illustrated embodiment, the cover 18 encapsulates and seals an end surface of the projection 42, and extends over most exterior surfaces of the anchor body 14, but includes openings aligned with the bore 22. The cover 18 may also cover an inner surface of the holes 62.

Figure 1:
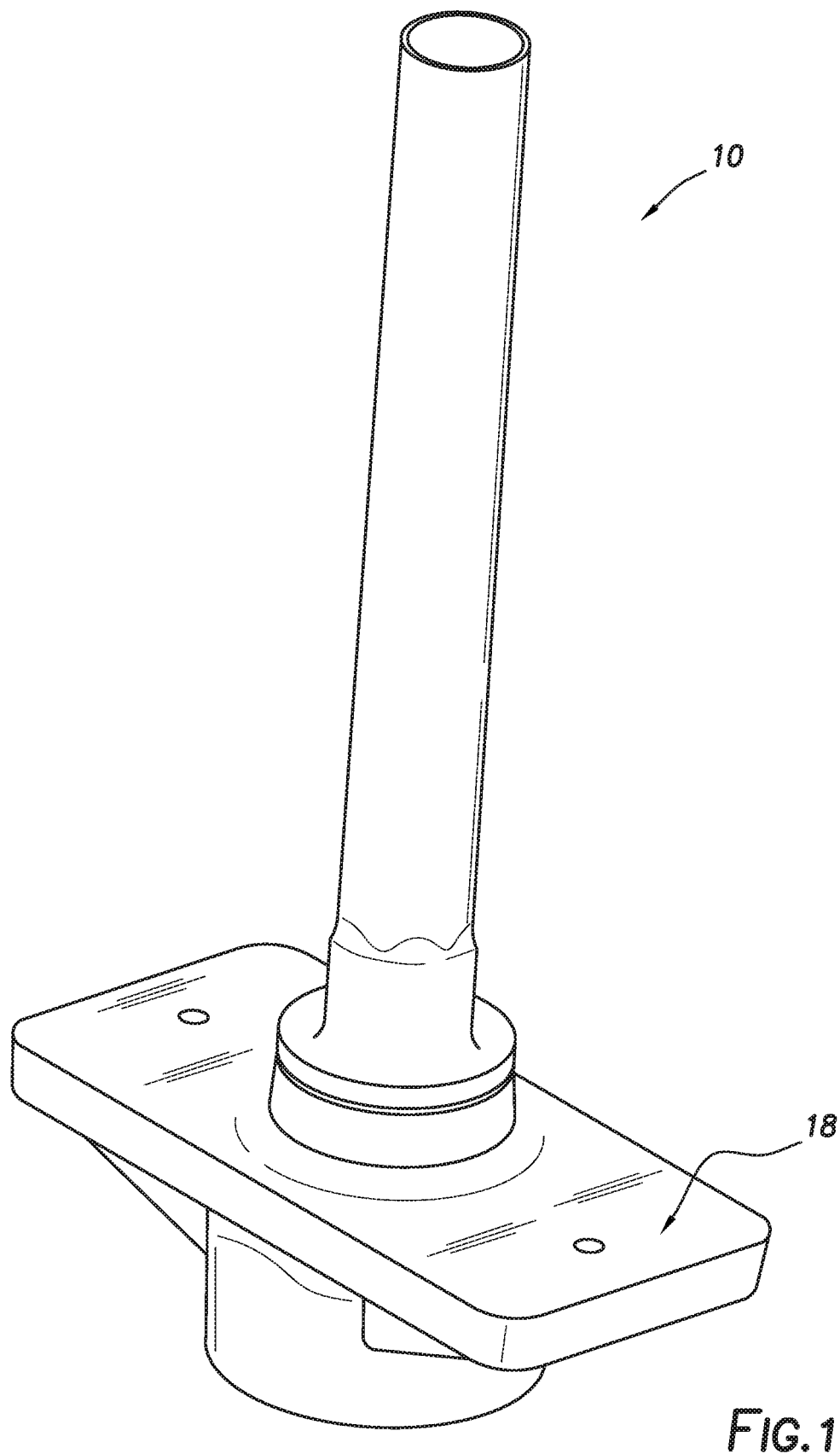
FIG. 1 is a perspective view of an anchor and a tubular member.
Figure 2:
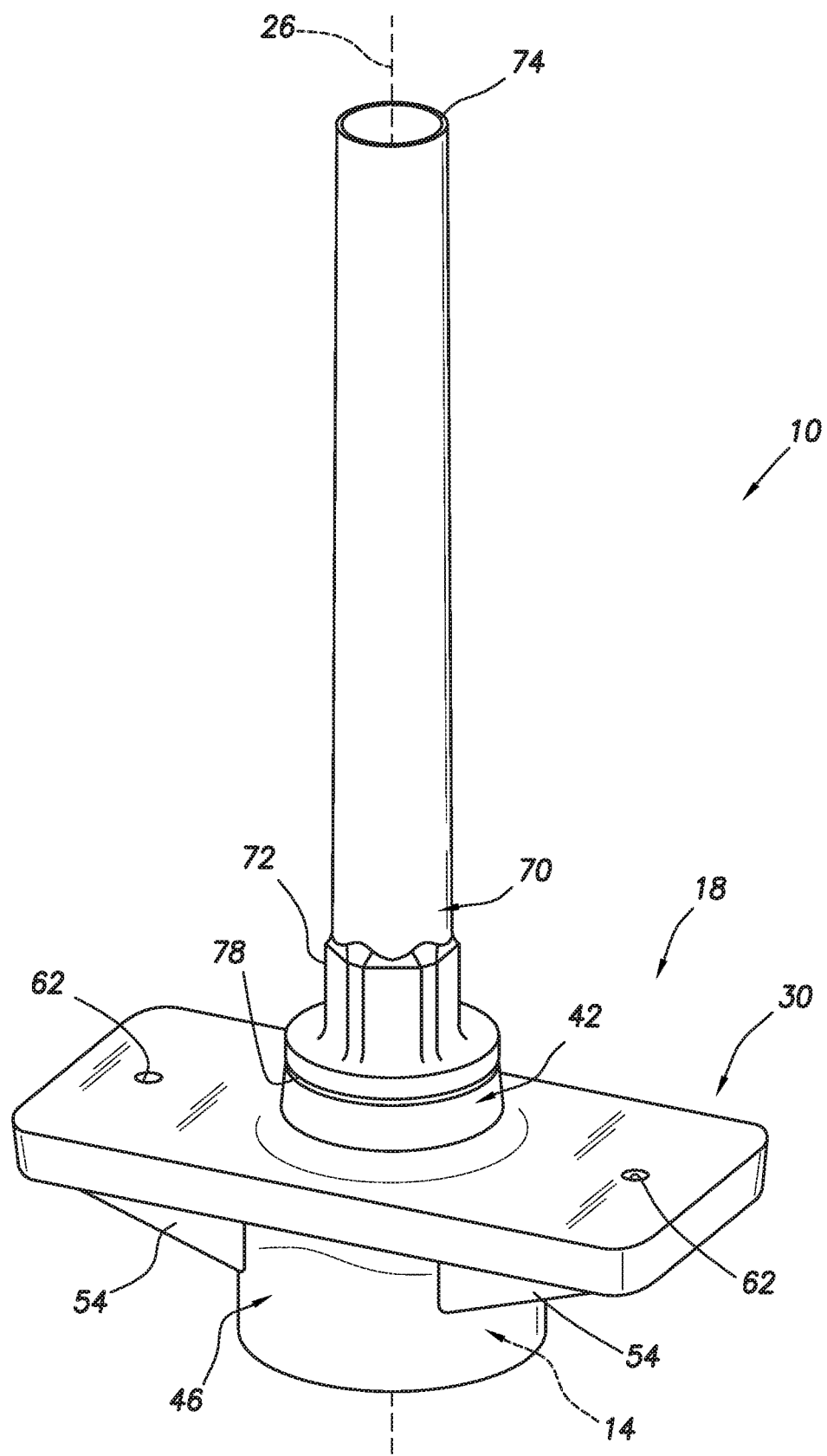
FIG. 2 is another perspective view of the anchor and the tubular member of FIG. 1.
Figure 3:
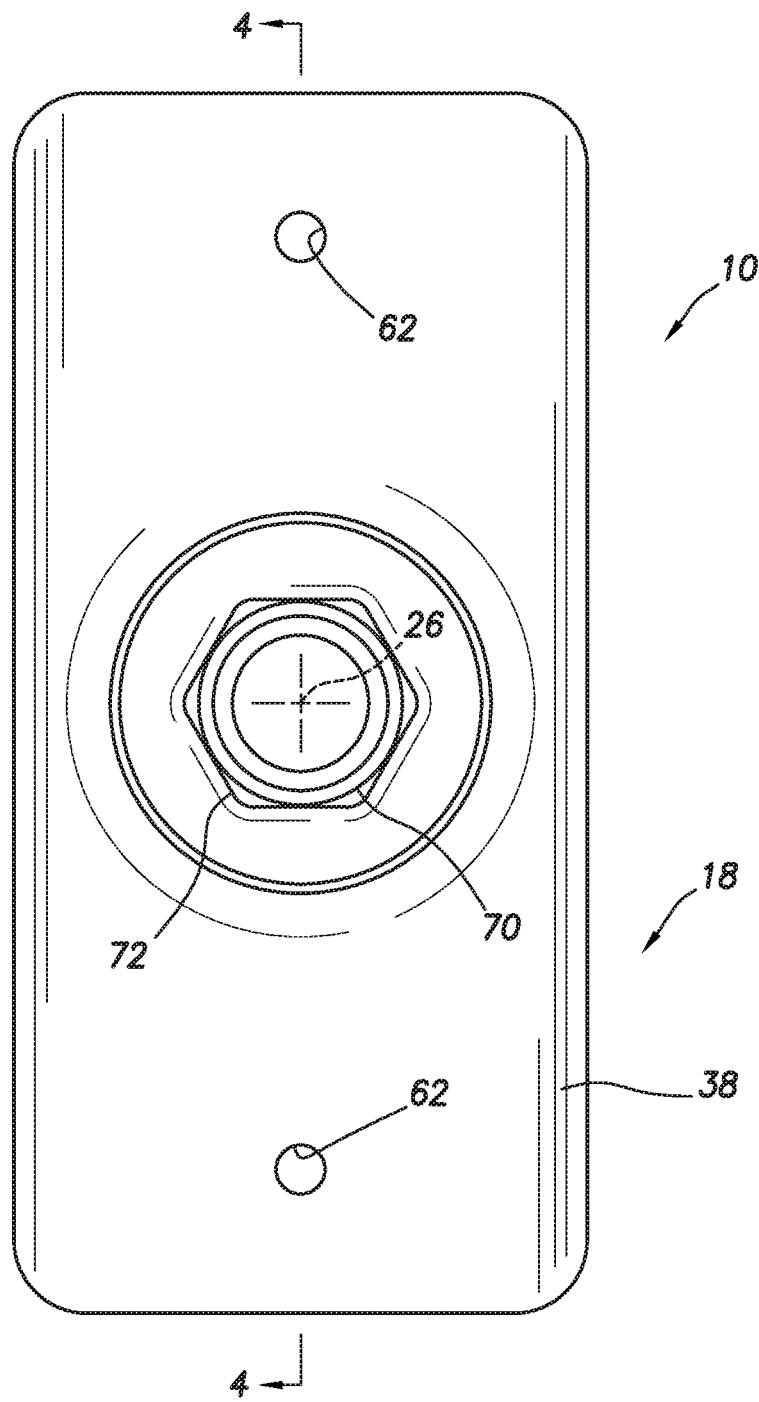
FIG. 3 is an end view of the anchor and the tubular member of FIG. 1.
Figure 9:
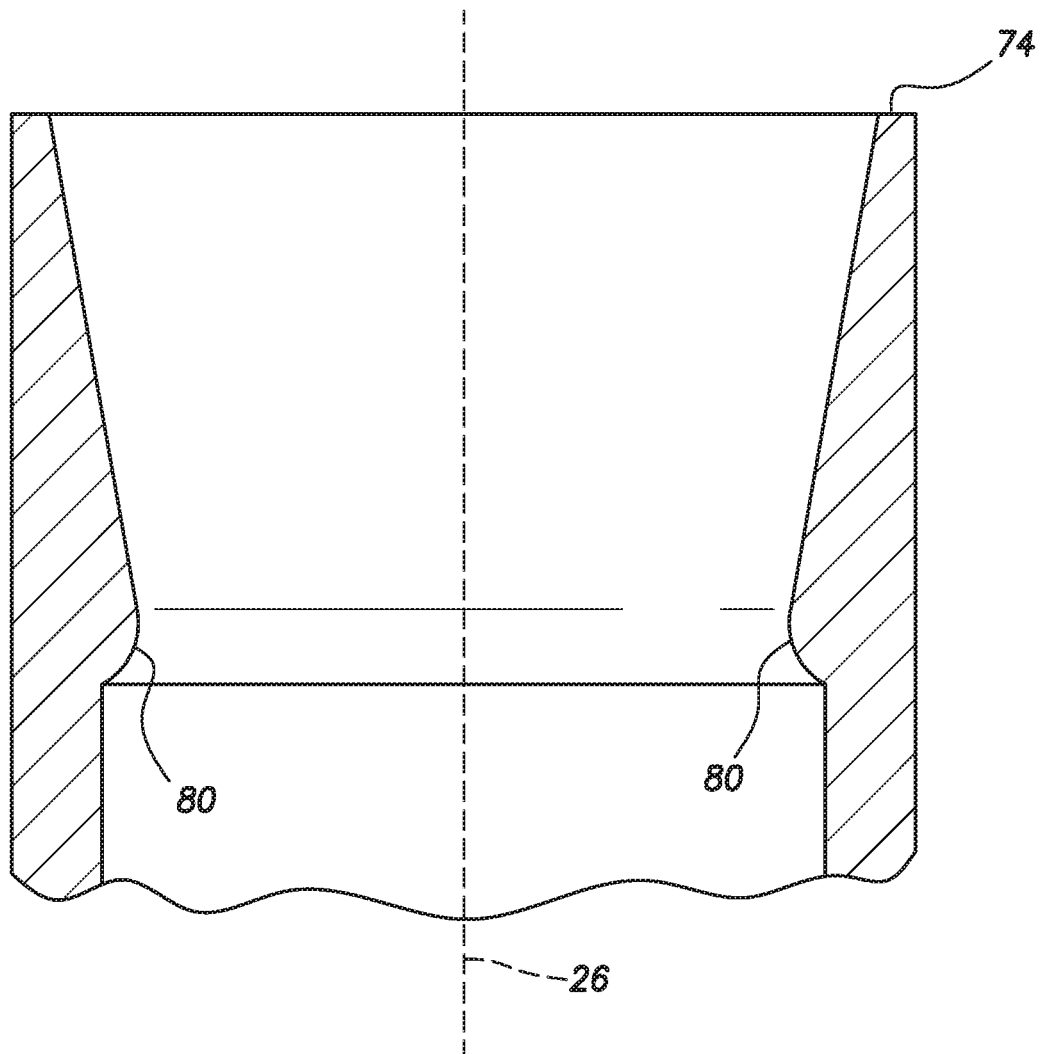
FIG. 9 is an enlarged view of section 9-9 of FIG. 4.

Referring again to FIGS. 1-4, a tubular member 70 is coupled to an end of the anchor 10 cover a portion of the tendon passing through the anchor bore 22 (FIG. 4). The tubular member 70 is at least initially formed as a separate component that is joined to the cover 18 adjacent one side of the anchor 10. As shown in FIGS. 2 and 4, the tubular member 70 is formed as an elongated member having a first end 74 and a second end 78. In the illustrated embodiment, the tubular member 70 has a substantially tubular shape, and a flange is positioned adjacent the second end. An outer surface of the tubular member 70 may include a hex surface 72 (FIG. 2). The tubular member 70 may have one or more sealing ridges 80 (FIG. 9) proximate the first end 74 and extending radially inwardly toward an axis 26 of the bore 22 to engage an outer surface of the tendon or a tendon sheath (not shown).

Figure 5:
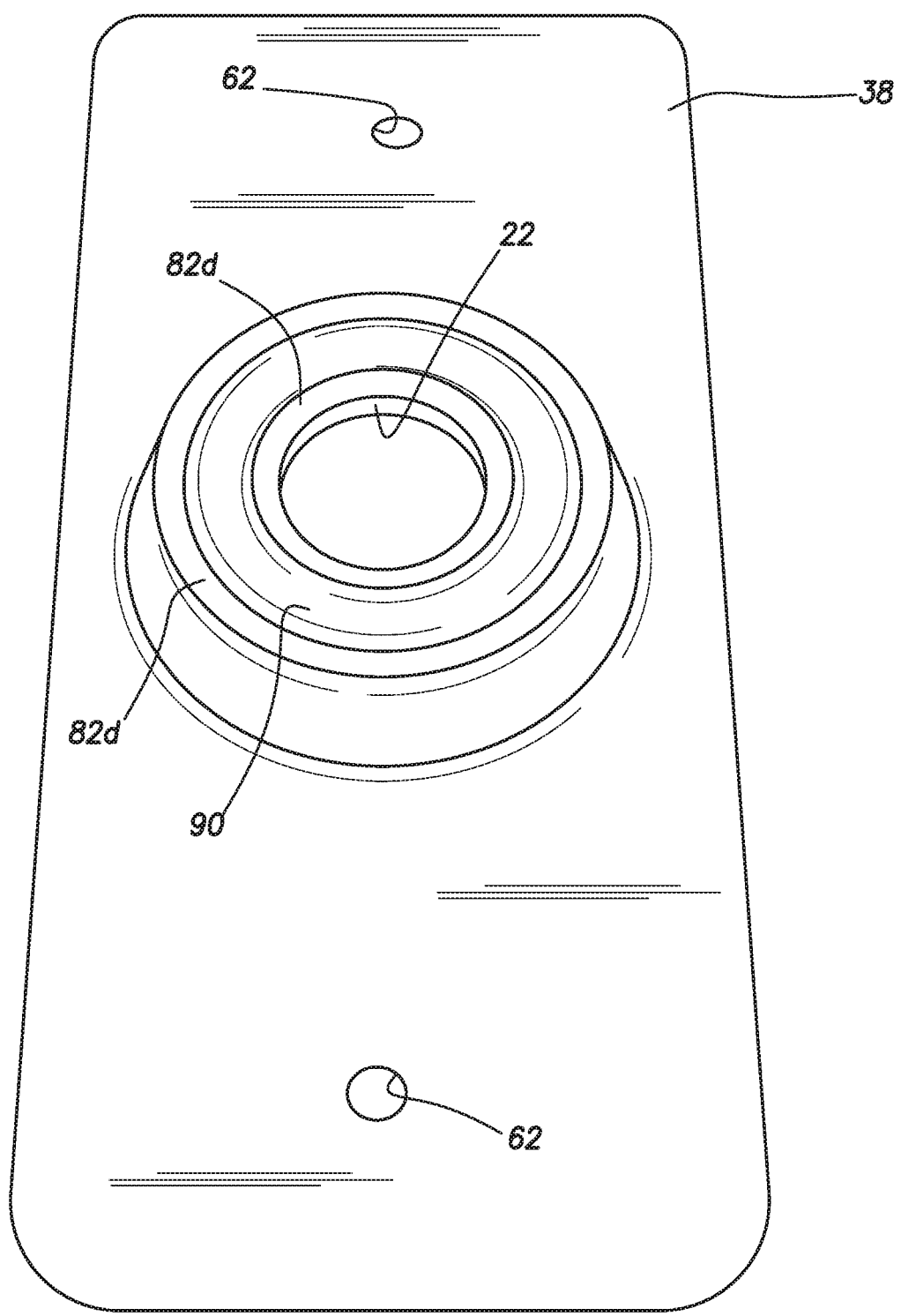
FIG. 5 is a perspective view of the anchor of FIG. 1.
Figure 6:
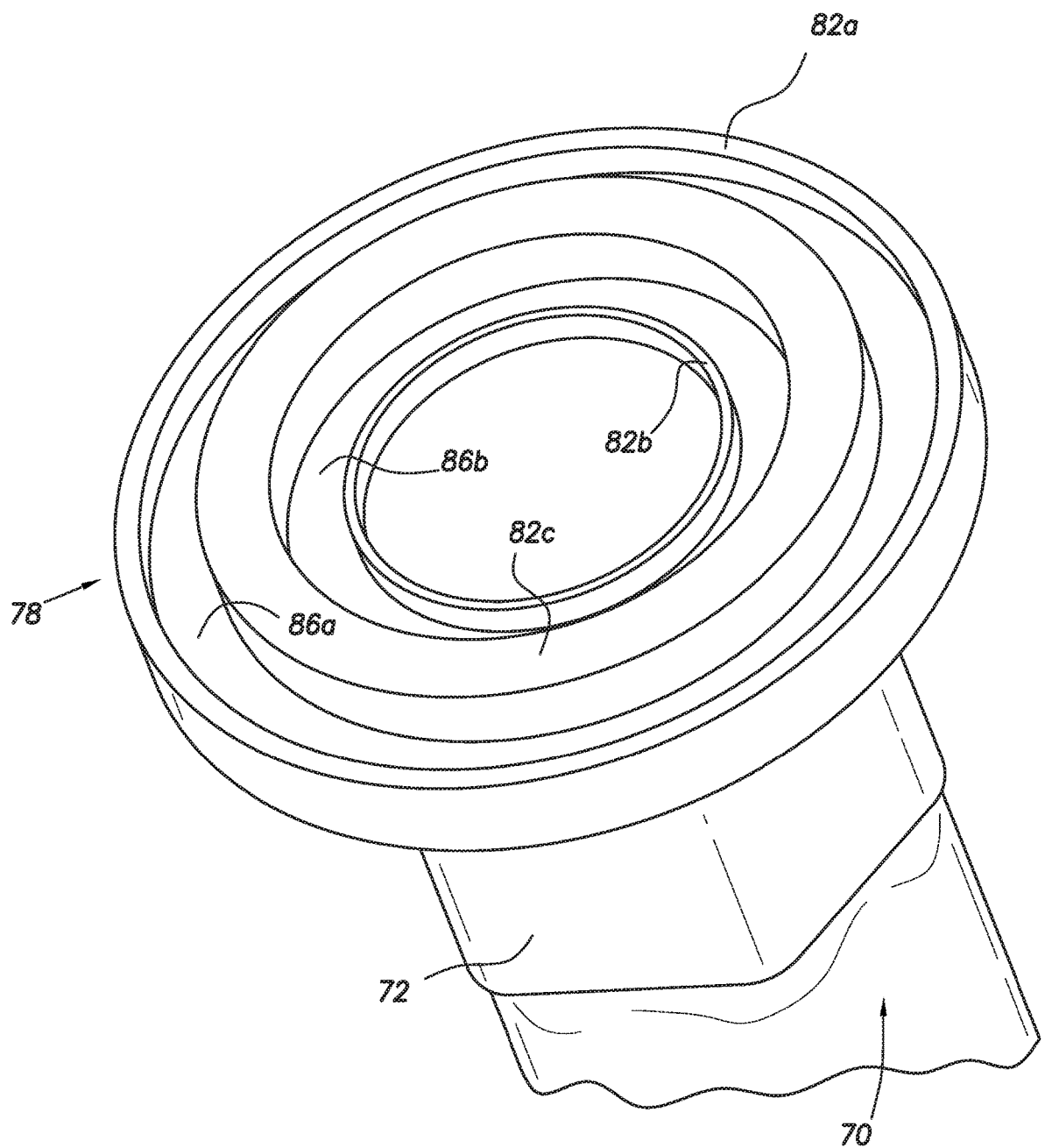
FIG. 6 is a perspective view of an end portion of the tubular member of FIG. 1.
Figure 7:
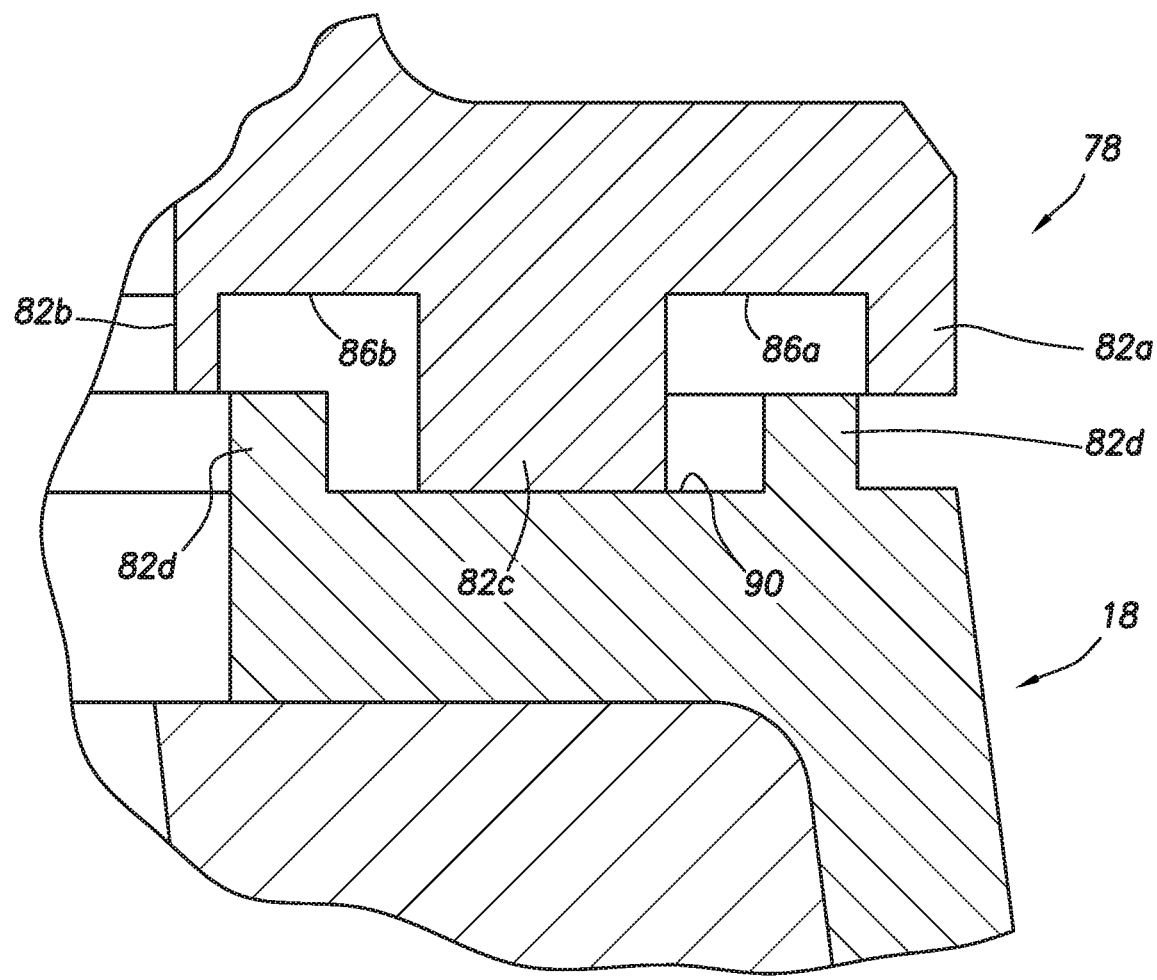
FIG. 7 is an enlarged view of section 7-7 of FIG. 4.

The second end 78 of the tubular member 70 is configured to be joined to the cover 18 of the anchor 10. As shown in FIGS. 5-7, an interface between the second end 78 of the tubular member 70 and a surface of the cover 18 includes a plurality of substantially mating protrusions 82. In the illustrated embodiment of FIGS. 6 and 7, an outer protrusion 82a, an inner protrusion 82b, and an intermediate protrusion 82c are positioned on a second end 78 of the tubular member 70. The intermediate protrusion 82c is positioned radially between the inner protrusion 82b and the outer protrusion 82a. As used herein, the term "radial" and variants thereof generally refer to a direction oriented in a plane perpendicular to the axis 26. In addition, a planar surface 86a extends between the outer protrusion 82a and the intermediate protrusion 82c, and a planar surface 86b extends between the inner protrusion 82b and the intermediate protrusion 82c. In addition, as shown in FIGS. 5 and 7, mating protrusions 82d extend from a planar end surface 90 of the cover 18. In the illustrated embodiment, one of the mating protrusions 82d is positioned at an outer radial position adjacent the outer protrusions 82a and the other mating protrusion 82d is positioned at an inner radial position adjacent the inner protrusion 82b.

In the illustrated embodiment shown in FIGS. 5 and 6, each of the protrusions 82a, 82b, 82c, and 82d has a generally annular shape; in other embodiments, the protrusions may have a different shape. Also, the intermediate protrusion 82c extends from the planar surfaces 86a, 86b at a greater distance than the outer and inner protrusions 82a, 82b and the intermediate protrusion 82c has a larger radial thickness. In other embodiments, the relative heights and thicknesses of the protrusions 82 may be configured in a different manner. Also, in the illustrated embodiment the mating protrusions 82d are positioned at radial distances such that one mating protrusion 82d is positioned between the inner protrusion 82b and the intermediate protrusion 82c, while the other mating protrusion 82d is positioned between the outer protrusion 82a and the intermediate protrusion 82c. In other embodiments, the relative radial positions of the protrusions 82a, 82b, 82c, and 82d may be configured in a different manner.

Figure 8:
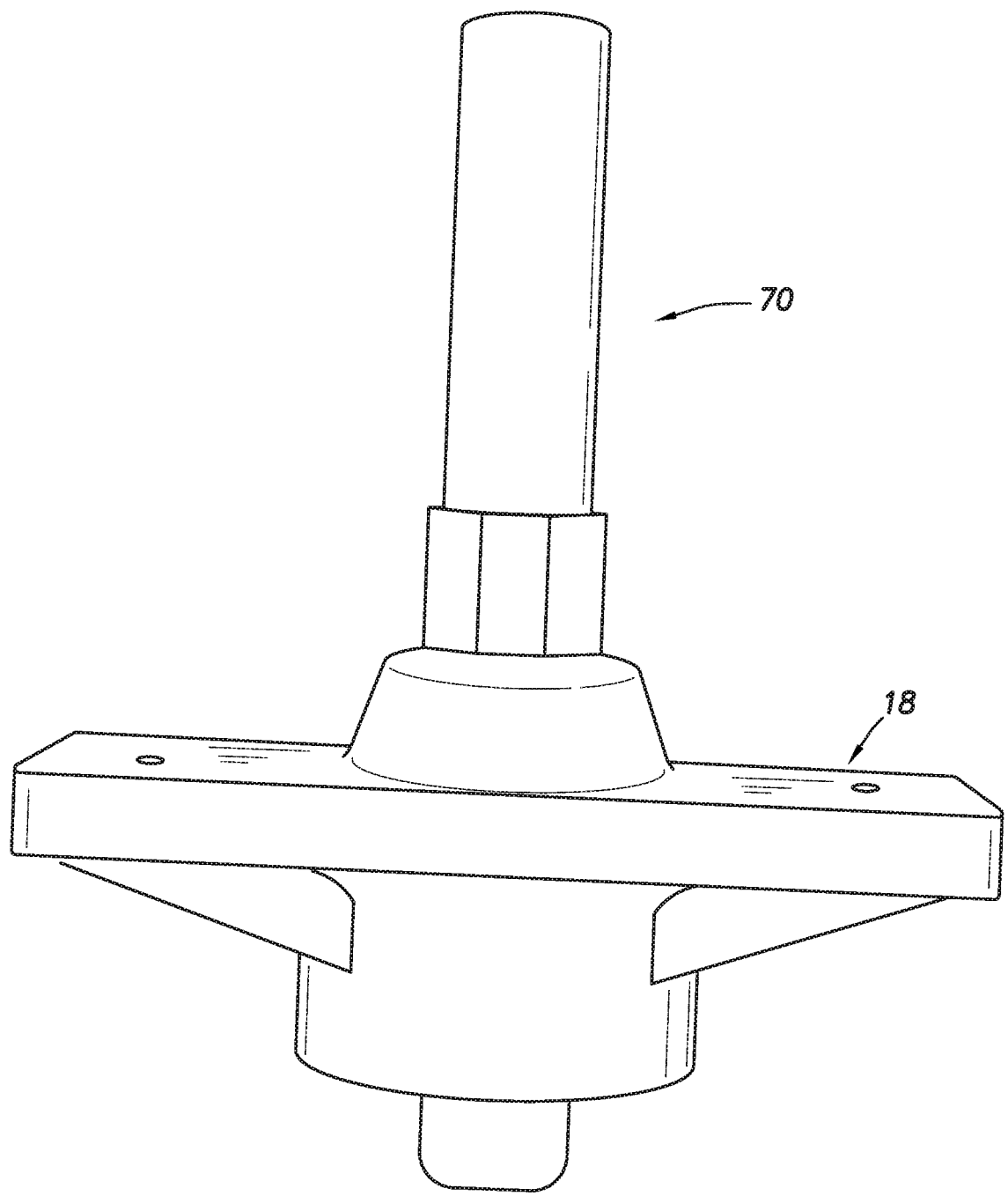
FIG. 8 illustrates a side view of an anchor and a tubular member.
Figure 10:
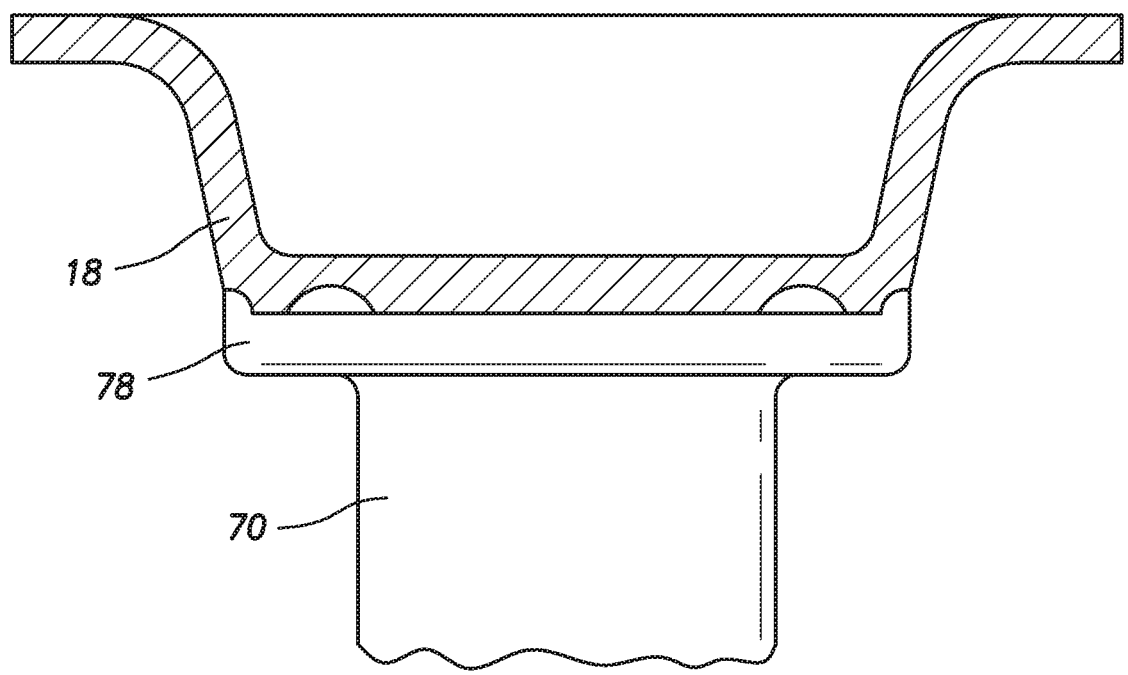
FIG. 10 illustrates a cross-section view of a tubular member joined to an anchor cover.

In some embodiments, the second end 78 of the tubular member 70 is attached to the cover 18 by a spin-welding process, with one of the anchor 10 and the tubular member 70 being secured in place while the other component is rotated at high speed. For example, the anchor 10 may be secured in place, while the tubular member 70 is mounted in a rotating chuck and rotated to a high speed. The rotating tubular member 70 is then moved against the anchor 10 to bring the second end 78 of the tubular member 70 into contact with the end surface 90 of the cover 18. The contact between the two components 18, 70 causes friction and generates heat, causing the parts to weld or mechanically fuse together to function as a unitary part (FIG. 8). As shown in FIG. 10, the intermediate protrusion 82c may substantially deform, melt, and fuse with the end surface 90 between the mating protrusions 82d. The intermediate protrusions 82c may be subjected to much of the friction and heat due to its larger height. In addition, radial spaces between the protrusions 82a, 82b, and 82d create pockets or flash traps to control the flow of material, ensuring that the melted material remains between the end surface 90 and the second end 78 of the tubular member 70.

Figure 11:
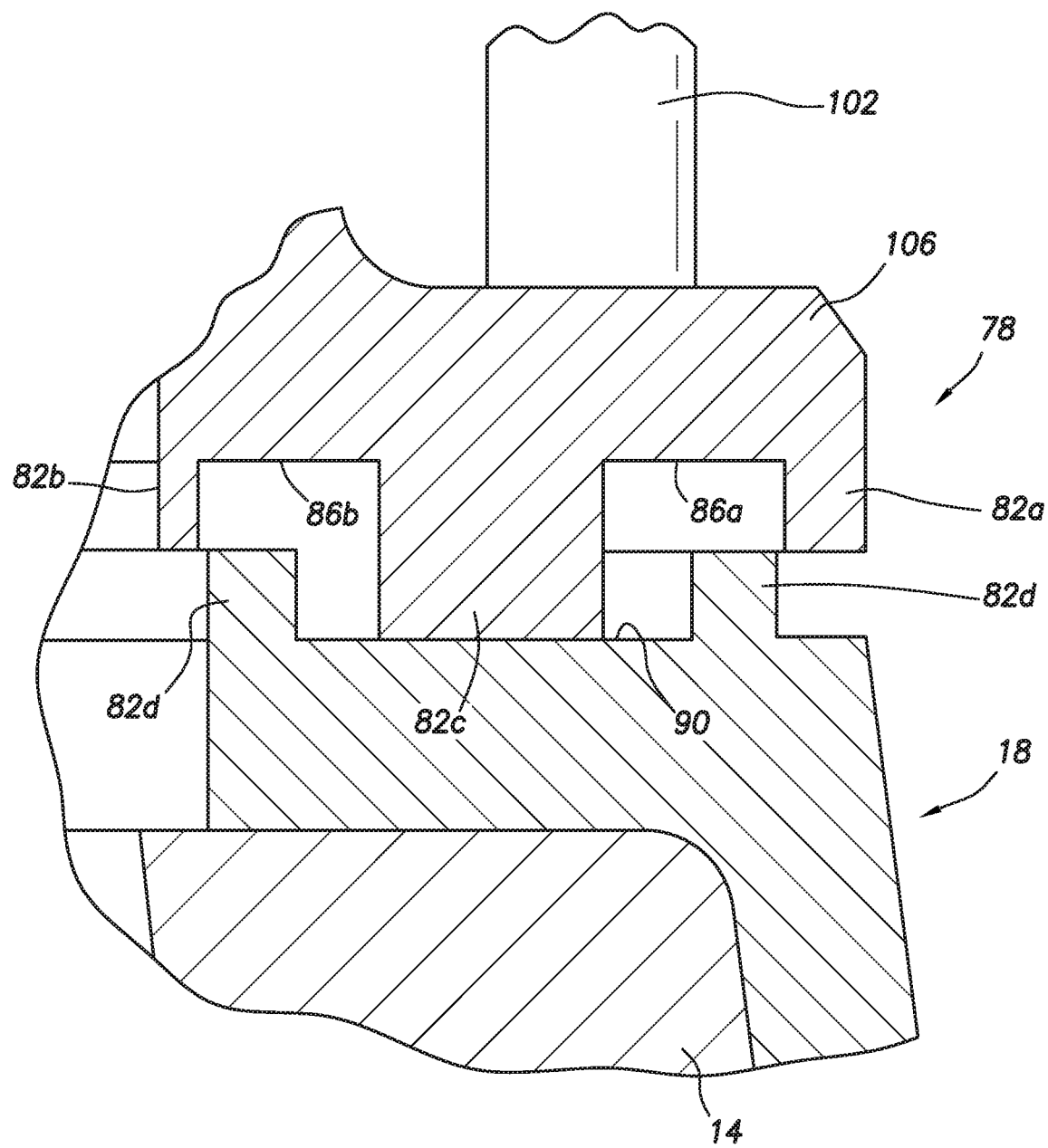
FIG. 11 is an enlarged view of section 7 of FIG. 4, illustrating attachment of a tubular member and an anchor cover according to another embodiment.

In another embodiment, as shown in FIG. 11, the second end 78 of the tubular member 70 is attached to the cover 18 by an ultrasonic welding process. For example, the anchor body 14 and cover 18 can be secured in a fixture, and the tubular member 70 can be positioned adjacent a surface of the cover 18 (e.g., by the mating relationship between the protrusions 82 as described above with respect to FIG. 7). A working surface of a welding horn or sonotrode 102 is positioned around the tube portion of the tubular member 70 and contacts a surface of the tubular member flange 106 proximate the second end 78, opposite the surface engaging the cover 18.

A controlled pressure is applied to the sonotrode 102 to clamp the tubular member flange 106 against the cover 18. The sonotrode is vibrated at a predetermined frequency (e.g., between 15 kHz and 30 kHz) for a predetermined period of time. The vibratory energy is transmitted through the material of the tubular member flange 106 to the points of contact between the tubular member flange 106 and the cover 18, creating frictional heat. When the temperature at the interface reaches a melting point of the material, the material flows into the flash traps. After the vibration stops, the material begins to cool and solidify. The pressure is maintained for a predetermined period of time while the cover 18 and the tubular member flange 106 fuse together. Once the melted portions solidify, the cover 18 and the tubular member 70 are joined. The clamping force is removed and the sonotrode 102 is retracted.

Among other things, the joining of the anchor 10 and tubular member 70 by spin- or ultrasonic welding improves an anchor-manufacturing process by reducing mold cycle times, since the required machine opening space and mold machine time is significantly reduced, and multi-cavity tools may be used. The anchor 10 and tubular member 70 enable a manufacturer to provide various combinations of anchors 10 and tubular members 70 and better customize the length and features of the tubular member 70. For example, multiple tubular members 70 having a variety of lengths may be manufactured separately from the encapsulated anchor bodies and subsequently tubular members having a selected length can be joined to the encapsulated anchor bodies so as to form a customized combination without requiring customization of the manufacturing equipment. Further, joining the tubular member 70 to the anchor 10 by welding ensures that a fluid-tight connection is made and eliminates the likelihood of fluid ingress at the interface therebetween. In some instances, a manufacturer may insert a restraint device between the tubular member 70 and the cover 18 during spin welding, thereby providing additional design flexibility and quick change response.

The independent embodiments described above and illustrated in the figures are presented by way of example only and are not intended as a limitation upon the concepts and principles of the present disclosure. As such, it will be appreciated that various changes in the elements and their configuration and arrangement are possible without departing from the spirit and scope of the present disclosure. One or more independent advantages and/or independent features may be set forth in the claims.

What is claimed is:

1. An anchor for use in post-tensioned concrete, comprising:
    an anchor body including a bore extending along an axis of the body; and
    a sealing cover including a first portion and a second portion, wherein the first portion at least partially encapsulates the body, wherein the second portion includes an elongated tube having first and second ends and is welded to the first portion at one of the first and second ends;
    wherein one of the first and second portions includes an end surface and a plurality of annular protrusions extending from the end surface and wherein an other of the first and second portions includes at least one annular mating protrusion configured to engage the plurality of protrusions.

2. The anchor according to claim 1 wherein the cover is formed of plastic.

3. The anchor according to claim 1 wherein the second portion is welded to the first portion by spin-welding.

4. The anchor according to claim 1 wherein the second portion is welded to the first portion by ultrasonic welding.

5. The anchor according to claim 1 wherein the plurality of protrusions includes a first protrusion, a second protrusion positioned radially outwardly from the first protrusion, and a third protrusion positioned radially outwardly from the second protrusion.

6. The anchor according to claim 5 wherein the at least one mating protrusion includes a first mating protrusion positioned between the first protrusion and the second protrusion, and a second mating protrusion positioned between the second protrusion and the third protrusion.

7. The anchor according to claim 5 wherein the second protrusion has at least one of a larger axial height and a larger radial thickness relative to the first protrusion and the third protrusion.

8. The anchor according to claim 5 wherein at least one of a space between the first protrusion and the second protrusion and a space between the second protrusion and the third protrusion defines a pocket to control material flow during spin-welding.

9. A method of forming the anchor of claim 1 comprises the steps of:
    a) providing the anchor body;
    b) at least partially encapsulating the anchor body in the sealing cover;
    c) providing at least one tubular member;
    d) securing one of the encapsulated anchor body and the tubular member against movement; rotating the other of the encapsulated anchor body and the tubular member; and
    e) engaging an end surface of the tubular member against a surface of the sealing cover so as to weld the tubular member to the sealing cover.

10. The method of claim 9 wherein step c) includes providing at least two tubular members having different dimensions and selecting one of the provided tubular members.

11. The method of claim 10 wherein the at least two tubular members have different lengths.

12. The method of claim 9 wherein step e) includes moving the protrusions on the end surface to engage the mating protrusions on the surface of the sealing cover.

13. The method of claim 12 wherein moving the protrusions forms radial pockets to receive a flow of welded material.

14. A method of forming the anchor of claim 1 comprises the steps of:
   a) providing the anchor body;
   b) at least partially encapsulating the anchor body in the sealing cover;
   c) providing at least one tubular member;
   d) positioning the tubular member adjacent a surface of the sealing cover; and
   e) vibrating the tubular member at a high frequency against the surface of the sealing cover so as to melt a portion of the tubular member and a respective said portion of the sealing cover so as to join the tubular member and the sealing cover.

15. The method of claim 14 wherein step c) includes providing at least two tubular members having different dimensions and selecting one of the provided tubular members.

16. The method of claim 14 wherein the at least two tubular members have different lengths.

17. The method of claim 14 wherein step e) includes positioning a sonotrode against a portion of the member to transmit vibrational energy to the member.

18. The method of claim 14 wherein vibrating the tubular member causes the melted portions of the tubular member and the sealing cover to flow into pockets formed between an end of the tubular member and the surface of the sealing cover.

* * * * *